June 3, 1930.  P. W. POMEROY  1,761,231
BRAKE
Filed Aug. 15, 1928
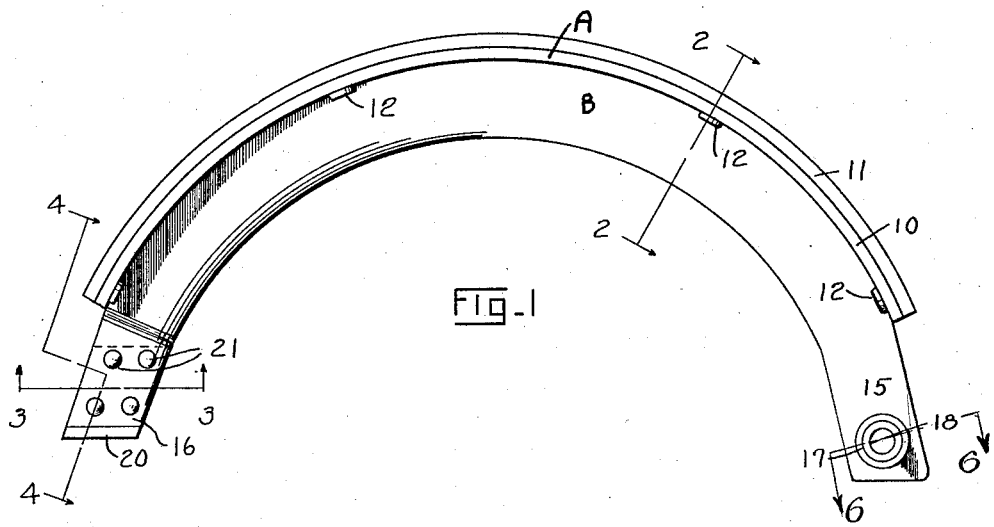
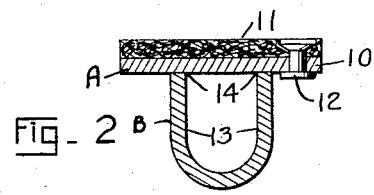
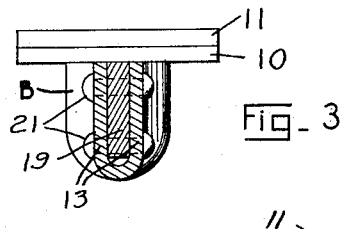
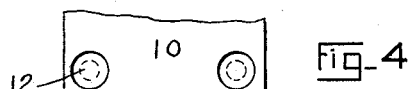
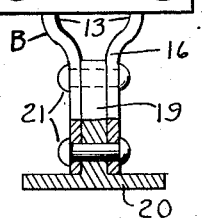
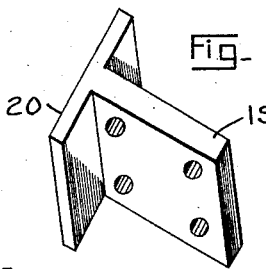
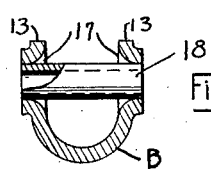
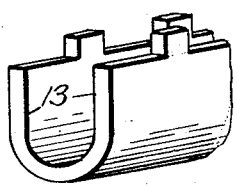
INVENTOR Patented June 3, 1930

1,761,231

UNITED STATES PATENT OFFICE

PERCY W. POMEROY, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed August 15, 1928. Serial No. 299,807.

This invention relates to vehicle brakes and particularly to the friction shoes therefor, the principal object being to provide a brake shoe of pressed metal which is rigid, simple in construction, light in weight and economical to manufacture.

Another object is to provide a pressed metal brake shoe with an arcuate lining-supporting part, a U-shaped reinforcing part having its marginal edges secured to the lining-supporting part, and a cam contact member supported by an end of said reinforcing part.

Another object is to provide a pressed metal brake shoe with an arcuate lining-supporting part and a U-shaped reinforcing part secured thereto, the ends of the reinforcing part being extended beyond the ends of the lining-supporting part to provide cam contact and pivot ends therefor.

Another object is to provide a pressed metal brake shoe having an arcuate lining-supporting band, with a U-shaped reinforcing member having its ends extending beyond the lining-supporting band, one of the ends being provided with a pivot pin bushing, and the sides of the other end being swaged inwardly toward each other to telescopically receive a cam contact member.

These being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, Figure 1 is a side elevation of the brake shoe.

Figure 2 is an enlarged section of the brake shoe taken on the line 2—2 of Figure 1.

Figure 3 is an enlarged section taken on the line 3—3 of Figure 1 showing a portion of the cam contact member secured between the side walls of the reinforcing member.

Figure 4 is an enlarged section taken on the line 4—4 of Figure 1 also showing the method of supporting the cam contact member.

Figure 5 is a perspective view of the cam contact member.

Figure 6 is a section taken on the line 6—6 of Figure 1 showing the pivot pin bushing supported by the brake shoe reinforcing member.

Figure 7 is a sectional view similar to Figure 2 showing a modified construction.

Figure 8 is a fragmentary perspective view showing the U-shaped reinforcing member illustrated in Figure 7.

Referring to the accompanying drawing in which like numerals refer to like parts throughout the several views, the brake shoe consists of two major parts, a lining-attaching part A and a radial reinforcing part B. The lining-attaching part A is formed to an arcuate shape from a flat metal strap or band 10. The brake friction facing 11 is secured to the outer face of the band 10 by suitable rivets 12.

The reinforcing part B of the brake shoe is shaped to the contour of the inner face of the lining-supporting band 10 from a U-shaped pressed metal stamping having parallel legs or side walls 13. The edge faces of these walls 13 are preferably welded at 14 to the inner face of the band 10 substantially as shown in section in Figure 2. It is to be understood however, that the walls 13 may be secured to the band 10 in any other convenient manner such as providing the same with a plurality of projections which may be riveted to the band. Both ends of the reinforcing part B project beyond the ends of the lining-supporting band 10 and the same are bent inwardly to provide the marginal edges thereof with flat surfaces.

Referring to Figure 6 which is a section through the pivoted end 15 of the brake shoe, the walls 13 of the reinforcing part B are formed with openings 17 and the metal surrounding these openings is flanged outwardly perpendicular thereto. This operation is preferably performed before the reinforcing member B is formed to the U-shaped section to facilitate punching of the same. When the reinforcing member B is formed to the U-shaped section the openings 17 come into axial alignment with each other and the flanges surrounding the same, form supporting surfaces for a pivot pin bushing 18 which is received in and supported by the same. The bushing 18 is forced into the opening 17 with a press fit so that it will be anchored against rotational and transverse movements.

The other projecting end 16 of the reinforcement member B is swaged or pressed in such a manner that the parallel walls 13 thereof are deflected inwardly toward each other as shown in Figures 3 and 4. As shown in these views the space between the walls 13 of the projecting end 16 is of a lesser distance than the space between the walls of the reinforcing member B. This distance however, between the walls 13 of the projecting portion 16 is substantially equal to the width of the leg 19 of a T-shaped cam contact member 20 which is shown in perspective in Figure 5. The leg 19 of the cam contact member 20 extends between the walls 13 of the reinforcing member B and the end faces of the walls 13 abut against the head of the cam contact member 20. Rivets 21 extending through the walls 13 of the projecting portion 16 and the leg 19 of the cam contact member 20 securely hold these parts together. Pressure exerted by the brake operating cam (not shown) against the face of the cam contact member 20 is absorbed entirely by the reinforcing member B of the brake shoe and none of the forces are transmitted directly to the lining-supporting part A of the brake shoe which might ordinarily tend to distort the same. The preferable method of forming the free end 16 of the brake shoe is to swage the same in any suitable manner before the reinforcing member B is assembled to the lining-supporting part A.

It is evident from the drawing and foregoing description that a very simple, efficient and economical means is provided for supporting the cam contact member for a brake shoe in which a reinforcement member having parallel side portions is provided.

It is to be understood however, that certain changes may be made in the specific embodiment of the invention described without departing from the spirit and substance of the broad invention, the scope of which is commensurate with the appended claims.

What I claim is:

1. A brake shoe having an arcuate pressed metal lining-supporting portion, a U-shaped pressed metal reinforcing portion secured thereto, and a T-shaped cam contact member having its leg telescopically received by said reinforcing member.

2. A brake shoe comprising an arcuate lining-supporting portion, a U-shaped reinforcing portion secured thereto intermediate the free edges thereof, and a T-shaped cam contact member having its leg telescopically received between and supported by the sides of said reinforcing member.

3. A brake shoe comprising an arcuate lining-supporting portion, a U-shaped reinforcing portion having its edges secured to said arcuate portion intermediate the edges thereof, and a T-shaped cam contact member having its leg telescopically received between and supported by the walls of said reinforcing member, and having its head engaging the ends of said walls.

4. In a pressed metal brake shoe having an arcuate lining-supporting portion, a U-shaped reinforcing member secured along the edge faces of its legs to said lining-supporting portion, at least one end of said reinforcing member being extended beyond said lining-supporting portion, and a T-shaped cam contact member having its leg received between and supported by the walls of the extended end of said reinforcing member, and having its head engaging the ends of said walls.

5. In a pressed metal brake shoe having an arcuate lining-supporting member, a separate U-shaped radial reinforcing member riveted along the edge faces of its legs to said lining-supporting member having an end extended beyond said lining-supporting member, the space between the legs of said reinforcing member being of greater distance than the space between the legs of said extended end, and a cam contact member secured to and supported by said extended end.

6. In a pressed metal brake shoe having an arcuate lining-supporting member, a U-shaped radial reinforcing member therefor having a projecting portion extending beyond an end of said lining supporting member, the distance between the walls of said reinforcing member being greater than the distance between the walls of said projecting portion, and a T-shaped cam contact member having its leg telescopically received between and secured to the walls of said projecting portion.

7. In a pressed metal brake shoe having an arcuate lining-supporting member, a separate U-shaped radial reinforcing member secured along the edge faces of its legs to said lining-supporting part having a projecting portion extending beyond an end of said lining-supporting member, said projecting end being formed with coaxial openings having their edges flanged outwardly to provide bearing surfaces, and a brake pivot pin bushing extending through said openings and supported by said flanged portions thereof.

Signed by me at South Bend, Indiana this 13th day of August 1928.

PERCY W. POMEROY.